United States Patent
Rule

(10) Patent No.: US 7,163,977 B2
(45) Date of Patent: Jan. 16, 2007

(54) METHOD TO REDUCE THE ALDEHYDE CONTENT OF POLYMERS

(75) Inventor: Mark Rule, Atlanta, GA (US)

(73) Assignee: Plastic Technologies, Inc., Holland, OH (US)

(*) Notice: Subject to any disclaimer, the term of this patent is extended or adjusted under 35 U.S.C. 154(b) by 113 days.

(21) Appl. No.: 11/129,160

(22) Filed: May 13, 2005

(65) Prior Publication Data

US 2006/0258786 A1 Nov. 16, 2006

(51) Int. Cl.
- C08J 5/52 (2006.01)
- C08G 63/78 (2006.01)
- B29D 22/00 (2006.01)

(52) U.S. Cl. ............... 524/128; 524/115; 524/123; 524/127; 524/413; 524/424; 524/431; 524/432; 524/433; 524/435; 524/436; 524/437; 528/272; 528/286; 428/35.7; 428/36.92

(58) Field of Classification Search ............... 524/115, 524/123, 127, 128, 413, 414, 424, 431, 432, 524/433, 435, 436, 437; 528/272, 286; 525/437; 428/35.7, 36.92; 264/633
See application file for complete search history.

(56) References Cited

U.S. PATENT DOCUMENTS

| | | | |
|---|---|---|---|
| 2,579,810 | A | 12/1951 | Fields |
| 3,014,949 | A | 12/1961 | Birum et al. |
| 4,224,203 | A | 9/1980 | Minagawa et al. |
| 4,232,146 | A | 11/1980 | Di Giacomo et al. |
| 4,256,872 | A | 3/1981 | DiGiacomo et al. |
| 4,260,542 | A * | 4/1981 | Joyce et al. ............... 524/123 |
| 4,263,425 | A | 4/1981 | Rothe et al. |
| 4,267,308 | A * | 5/1981 | Parziale et al. ............... 528/395 |
| 4,276,411 | A | 6/1981 | DiGiacomo et al. |
| 4,291,093 | A | 9/1981 | Wishman et al. |
| 4,291,111 | A | 9/1981 | Lu |
| 4,374,242 | A | 2/1983 | Dines et al. |
| 4,409,375 | A * | 10/1983 | Hartman et al. ............... 525/505 |
| 4,421,887 | A | 12/1983 | Horie et al. |
| 4,436,899 | A * | 3/1984 | DiGiacomo et al. ......... 528/395 |
| 4,446,061 | A | 5/1984 | Joyce, III et al. |
| 4,454,312 | A | 6/1984 | Kuze et al. |
| 4,501,615 | A | 2/1985 | Reeder et al. |
| 4,591,629 | A | 5/1986 | El-Ghatta et al. |
| 4,837,115 | A | 6/1989 | Igarashi et al. |
| 4,883,892 | A | 11/1989 | Hardy et al. |
| 4,962,228 | A * | 10/1990 | Hellring ............... 562/8 |
| 4,972,011 | A | 11/1990 | Richardson et al. |
| 5,185,426 | A | 2/1993 | Verheijen et al. |
| 5,234,979 | A | 8/1993 | Todtemann et al. |
| 5,258,233 | A | 11/1993 | Mills et al. |
| 5,290,746 | A | 3/1994 | Alberti et al. |
| 5,310,771 | A | 5/1994 | Walters |
| 5,340,884 | A | 8/1994 | Mills et al. |
| 5,519,108 | A | 5/1996 | Yuo et al. |
| 5,573,820 | A | 11/1996 | Harazoe et al. |
| 5,608,032 | A | 3/1997 | Yuo et al. |
| 5,616,749 | A | 4/1997 | Cheng et al. |
| 5,650,469 | A | 7/1997 | Long et al. |
| 5,684,116 | A | 11/1997 | Martl et al. |
| 5,721,306 | A | 2/1998 | Tsipursky et al. |
| 5,760,121 | A | 6/1998 | Beall et al. |
| 5,830,992 | A | 11/1998 | Whalen |
| 5,844,032 | A | 12/1998 | Serrano et al. |
| 5,877,248 | A | 3/1999 | Beall et al. |
| 5,891,226 | A | 4/1999 | Kleiner et al. |
| 5,898,058 | A | 4/1999 | Nichols et al. |
| 5,902,539 | A | 5/1999 | Schmidt et al. |
| 5,998,528 | A | 12/1999 | Tsipursky et al. |
| 6,013,756 | A | 1/2000 | Hagen et al. |
| 6,042,908 | A | 3/2000 | Long et al. |
| 6,043,335 | A | 3/2000 | Banach et al. |
| 6,228,903 | B1 | 5/2001 | Beall et al. |
| 6,239,233 | B1 | 5/2001 | Bell et al. |
| 6,274,212 | B1 * | 8/2001 | Rule et al. ............... 428/36.92 |
| 6,329,451 | B1 | 12/2001 | Matsumoto et al. |
| 6,365,071 | B1 | 4/2002 | Jenewein et al. |
| 6,365,659 | B1 | 4/2002 | Aoyama et al. |
| 6,365,661 | B1 | 4/2002 | Fischer et al. |
| 6,395,865 | B1 | 5/2002 | Schmidt et al. |
| 6,489,433 | B1 | 12/2002 | Duan et al. |
| 6,489,434 | B1 | 12/2002 | Jen |
| 6,506,853 | B1 | 1/2003 | Duan |
| 6,541,598 | B1 | 4/2003 | Duan et al. |
| 6,559,271 | B1 | 5/2003 | Schaaf et al. |
| 6,586,558 | B1 | 7/2003 | Schmidt et al. |
| 6,649,731 | B1 | 11/2003 | Hori et al. |
| 6,680,094 | B1 | 1/2004 | Kikuchi et al. |
| 6,703,474 | B1 | 3/2004 | Fujimori et al. |
| 6,716,899 | B1 | 4/2004 | Klatt et al. |
| 6,774,204 | B1 | 8/2004 | Putzig |
| 2003/0109667 | A1 | 6/2003 | Fujimori et al. |
| 2003/0144459 | A1 | 7/2003 | Fujimori et al. |
| 2004/0024139 | A1 | 2/2004 | Suzuki et al. |

(Continued)

FOREIGN PATENT DOCUMENTS

DE 10132058 1/2003

(Continued)

Primary Examiner—Samuel A. Acquah
(74) Attorney, Agent, or Firm—Fraser Martin & Miller LLC; Donald R. Fraser

(57) ABSTRACT

Methods to decrease aldehyde content of a polymer are provided. An effective amount of an additive that contains a P—H functionality is incorporated into the polymer in the presence of an acidic of basic catalyst compositions are also provided.

17 Claims, No Drawings

U.S. PATENT DOCUMENTS

| | | |
|---|---|---|
| 2004/0044173 A1 | 3/2004 | Fujimori et al. |
| 2004/0059037 A1 | 3/2004 | Wang et al. |
| 2004/0249113 A1 | 12/2004 | Quillen et al. |
| 2005/0014929 A1 | 1/2005 | Rule |
| 2005/0075426 A1 | 4/2005 | Campbell et al. |

FOREIGN PATENT DOCUMENTS

| | | |
|---|---|---|
| FR | 2502162 | 9/1982 |
| WO | WO 97/28218 A1 | 8/1997 |

* cited by examiner

METHOD TO REDUCE THE ALDEHYDE CONTENT OF POLYMERS

FIELD OF THE INVENTION

The invention relates to methods for reducing aldehyde content of polymers and related compositions.

BACKGROUND OF THE INVENTION

Polyesters, especially poly(ethylene terephthalate) (PET) are versatile polymers that enjoy wide applicability as fibers, films, and three-dimensional structures. A particularly important application for PET is for containers, especially for food and beverages. This application has seen enormous growth over the last 20 years, and continues to enjoy increasing popularity. Despite this growth, PET has some fundamental limitations that restrict its application in these markets. One such limitation is its tendency to generate acetaldehyde (AA) when it is melt processed. The primary mechanism for AA generation in PET involves a 1,5-sigmatropic rearrangement within the [—C(=O)—OCH$_2$CH$_2$—] moiety. Because AA is a small molecule, AA generated during melt processing can migrate through the PET. When PET is processed into a container, AA will migrate over time to the interior of the container. Although AA is a naturally occurring flavorant in a number of beverages and food products, in many instances the taste imparted by AA is considered undesirable. For instance, AA will impart a fruity flavor to water, which detracts from the clean taste preferred for this product.

PET is traditionally produced by the transesterification or esterification of a terephthalate precursor (either dimethyl terephthalate or terephthalic acid, respectively) and ethylene glycol, followed by melt polycondensation. If the end use application for the melt-polymerized PET is for food packaging, the PET is then subject to an additional operation known as solid-state polymerization (SSP), where the molecular weight is increased and the AA generated during melt polymerization is removed. A widely used method to convert the SSP PET into containers consists of drying and remelting the PET, injection molding the molten polymer into a container precursor (preform), and subsequently stretch blow-molding the preform into the final container shape. During the injection molding process acetaldehyde is regenerated.

Historically, the impact of AA on product taste has been minimized by use of low-activity polymerization catalysts to minimize regeneration of AA during injection molding, use of extended solid-state polymerization times to remove AA prior to injection molding, and use of low-shear screws and balanced hot-runner systems to minimize AA regeneration during injection molding. Typical preform AA levels for PET preforms produced using these methods are 6–8 ug/g (ppm), which is acceptable for many applications where the taste threshold for AA is sufficiently high, or where the useful life of the container is sufficiently short. For other applications, where the desired shelf-life of the container is longer, the product is more sensitive to off-taste from AA, or the prevailing environmental conditions are warmer, it is not possible to keep the AA level below the taste threshold even by employing these methods. For example, in water the taste threshold is considered to be less than about 40 ug/L (ppb), and often a shelf-life of up to two years is desired. For a PET bottle that contains 600 ml of beverage, a preform AA content of 8 ppm can result in a beverage AA level greater than 40 ppb in as little as one month.

Even when acceptable AA levels can be achieved using the above-described methods, achieving those AA levels comes at a significant cost. That cost includes the need to carry out a solid-state polymerization step after the melt polymerization of PET, the need for specially designed injection molding equipment, and the need for low-activity polymerization catalysts. In addition, because AA is regenerated during the injection molding process and the amount generated is critically dependent on the injection molding process conditions, preform manufacturers must continually monitor AA content during container production.

In addition to the afore-mentioned process-related methods, other methods to minimize AA content of polyesters include modification of the polymer itself through the use of lower intrinsic viscosity (IV) resins or the use of lower melting resins. However, lower IV resins produce containers that are less resistant to environmental factors such as stress crack failure. Lower melting resins are achieved by increasing the copolymer content the PET resin, but increasing the copolymer content also increases the natural stretch ratio of the polymer, which translates into decreased productivity in injection molding and blow molding.

Another approach to minimize the AA content of polyesters has been to incorporate additives into the polyester that will selectively react with, or scavenge, the acetaldehyde that is present. Thus Igarashi (U.S. Pat. No. 4,837,115) discloses the use of amine-group terminated polyamides and amine-group containing small molecules as AA scavengers. Igarashi teaches that the amine groups are effective because they can react with AA to form imines, where the amine nitrogen forms a double bond with the AA moiety. Igarashi teaches that essentially any amine is effective. Mills (U.S. Pat. Nos. 5,258,233; 5,650,469; and 5,340,884) and Long (U.S. Pat. No. 5,266,416) disclose the use of various polyamides as AA scavengers, especially low molecular weight polyamides. Turner and Nicely (WO 97/28218) disclose the use of polyesteramides. These polyamides and polyesteramides are believed to react with AA in the manner described by Igarashi. Rule et. al. (U.S. Pat. No. 6,274,212) discloses the use of heteroatom-containing organic additives that can react with acetaldehyde to form unbridged 5- or 6-member rings, with anthranilamide being a preferred organic additive.

While these AA scavengers are effective at reducing the AA content of polyesters, they suffer from their own drawbacks. For example, relatively high loadings of polyamides or polyesteramides are needed to effect significant AA reductions, and very significant yellowing of PET can occur on incorporation of these amine-containing additives. The use of anthranilamide also results in some degree of discoloration of PET. This color formation inherently restricts the use of these additives to packaging where the PET can be tinted to mask the color. However, most PET packages in use today are clear and uncolored. In addition, the degree of yellowing caused by these AA scavengers increases with degree of melt processing. This effect is particularly noticeable in recycled PET. Another drawback of the additives disclosed in the above references is that, to a greater or lesser degree, they all are extractable, and therefore can themselves affect the taste of food or beverages packaged in containers made from polyesters incorporating these additives.

A different method of decreasing the AA content of polyesters is disclosed by Rule (US application 2005/0014929) wherein acetaldehyde present in melt-processed PET is disproportionated to ethanol, acetic acid, and/or ethyl acetate by the action of a catalyst capable of promoting a hydride shift between an organic donor molecule and acetaldehyde. Thus, a need exists for new and useful methods and compositions for decreasing the acetaldehyde content of various polymers, including PET.

In addition to polyesters, aldehydes are present in a number of other polymers, such as polypropylene, polyethylene, polyethylene oxide, polypropylene oxide, polystyrene, polyvinyl chloride, and polyacetal. As in polyesters, in these polymers aldehydes are generated by the thermal or thermal-oxidative degradation of the polymers themselves and/or of additives in the polymers. The aldehydes generated are often detrimental to the taste and odor properties imparted to containers manufactured from these polymers.

SUMMARY OF THE INVENTION

The present invention provides methods to decrease the aldehyde content of a polymer by incorporating into the polymer an effective amount of an additive that contains a P—H functionality in the presence of an acidic or basic catalyst. The additive can be an inorganic or inorganic/organic phosphite salt of a divalent, trivalent, or tetravalent metal. The additive reacts with the aldehyde by the acid or base catalyzed addition of the P—H moiety across the carbonyl group of the aldehyde to form an alpha-hydroxy phosphonate. Exemplary additives are tetravalent, trivalent, and divalent metal phosphites and phosphite-phosphonates. The additive can be incorporated into a molten polymers such as poly(ethylene terephthalate) homopolymer or copolymer. In one exemplary embodiment, the additive is present in the polymer at a concentration between about 1 and 5000 ppm. In another exemplary embodiment, the additive is present at between about 10 and 1000 ppm. The treated polyester can be advantageously molded into a solid article, such as a container for food or beverage. The invention is similarly directed to articles produced from the inventive methods.

DETAILED DESCRIPTION OF EXEMPLARY EMBODIMENTS OF THE INVENTION

The present invention relates to a method which substantially decreases the aldehyde content of polymers, especially polyesters that are made from ethylene glycol and aromatic diacids or diesters. These polyesters are especially prone to contain aldehydes derived from the thermal degradation of the ethylene linkages. The present invention is particularly useful with PET, but is also applicable to other polyesters and other polymers that contain aldehydes either as impurities or as reaction byproducts. Examples of other polyesters contemplated by this invention include but are not limited to poly(ethylene naphthalate), poly(cyclohexylene-dimethylene terephthalate), poly(ethylene isophthalate), and copolymers of these polyesters. Examples of other polymers include but are not limited to polyethylene, polypropylene, polyethylene oxide, polypropylene oxide, polystyrene, polyvinyl chloride, and polyacetal.

In the present invention, aldehydes present in these polyesters are sequestered by contact with an additive containing a P—H functionality capable of adding across the carbonyl group of the aldehyde to form an alpha-hydroxy phosphonate. This reaction is catalyzed by acids or bases present in the polymer. Preferably, the additive is an inorganic or inorganic/organic phosphite salt of a divalent, trivalent, or tetravalent metal. Exemplary additives are tetravalent, trivalent, and divalent metal phosphites and phosphite-phosphonates, hereinafter referred to collectively as metal phosphites. The acids or bases required to catalyze this reaction are advantageously co-incorporated into the polymer along with the additive containing the P—H functionality. Alternatively the acids or bases can be supplied in any other suitable manner. For example. The acids and bases can be generated in situ by the oxidation of a portion of the metal phosphite P—H functionality to an acidic P—OH functionality. The acids or bases required to catalyze this reaction may also naturally be present in the polymer. In a preferred embodiment, the additive is a layered metal phosphite which also contains an effective level of acidic and/or basic sites.

Chemical reactions of this type are known in the literature (see, for example U.S. Pat. No. 2,579,810), but have not been applied to the reduction of aldehyde content in polymers. While the reaction of aldehydes with a P—H functionality is effective for the formation of alpha-hydroxyphosphonates in the liquid phase, it is surprising that this reaction is effective for sequestering aldehydes in solid phase polymers. For example, compared to the high concentrations of reactants necessary to achieve reasonable conversions and reaction rates in the liquid phase, aldehydes are present in polymers such as polyesters at very low concentrations, typically at levels of 1–100 ppm. Furthermore, only low concentrations of the P—H containing moiety and the acid or base catalyst can be tolerated in a polymer, since loadings greater than approximately 0.25 wt % may adversely affect other properties of the polymer, such as clarity or processability. Furthermore, most of the acetaldehyde present in a PET container sidewall is formed via the room-temperature hydrolysis of vinyl esters and methyl dioxolane. Therefore, the sequestering agents of the present invention are advantageously active at room temperature where the polymer is in a solid state and the diffusional rates for the aldehydes are many orders of magnitude lower than in the liquid phase.

However, as will be seen in the examples presented below, the aldehyde sequestering reaction disclosed in the present specification do occur in polymers at room temperature, even with very low loadings of the metal phosphites and at very low concentrations of aldehydes. That the reaction is so effective under these conditions is both surprising and highly useful, because it provides an efficient method to sequester aldehydes present in polyesters and other polymers.

Unlike most previous methods to sequester acetaldehyde in PET, wherein the both the starting materials and reaction products are relatively small molecules which have a potential to migrate from the polymer, the metal phosphites used in exemplary embodiments of the present invention are solid particulates. Because the metal phosphites of the present invention are solid, insoluble materials, these additives are essentially incapable of being extracted from the polymer matrix, and therefore have no potential to directly impact the taste of products.

In addition to sequestering aldehydes, the metal phosphites of the present invention also possess the capability of reacting with free radicals, such as those formed during high temperature processing of polymer. The formation of free radicals is especially prevalent during the melt processing of polymers in the presence of oxygen, and is a leading cause of polymer degradation in general and is specifically a mechanism for aldehyde generation. In order to suppress the polymer degradation reactions, organic antioxidants such as hindered phenols and trivalent phosphorous compounds are routinely added to polymers such as polypropylene and polyethylene. However, because these antioxidants are relatively small molecules, they all have some tendency to migrate. Hence, use of the metal phosphites of the present invention constitutes an advantage over organic antioxidants.

Because the additives of the present invention are insoluble, heterogeneous materials, the surface area and particle size may influence the effectiveness of the metal phosphite. In general, higher surface areas and smaller particle sizes correspond with higher scavenging activity; therefore, a material that possesses a higher surface area or smaller particles sizes may be preferred over a material with the same nominal chemical composition that possesses a lower surface area or larger particle size. At a given loading, smaller particle sizes are expected to correlate with higher activity since the diffusion path to the metal phosphite will be shorter. This is especially true at temperatures below about 80 deg C., where the diffusion of the aldehyde may be the rate limiting step for reaction. In addition, the smaller the particle size the less likely will the metal phosphite affect the processability and clarity of the polyester. Therefore materials with smaller mean particle sizes are considered advantageous relative to a larger particle size material of the same chemical composition and specific surface area. In the present invention, high activity is obtained by additives where the average particle size is less than about 5 microns, while relatively lower effectiveness is obtained by additives where the average particle size is >30 microns. There is no specific lower limit to the preferred particle size, except as dictated by the cost, availability, and processability of the materials.

Of the metal phosphites, layered metal phosphites are considered particularly advantageous, since layered metal phosphites tend to have higher aspect ratios. Consequently, at a given loading layered metal phosphites will generally provide more particles per unit volume of polymer than non-layered metal phosphites. Layered metal phosphites which have a layer spacing greater than about 15 angstroms are considered particularly advantageous, since these layered metal phosphites will have a greater tendency to exfoliate under the polymer melt processing conditions, thus creating even greater numbers of individual particles per unit volume of polymer.

Metal ions suitable for preparation of the metal phosphites include but are not limited to titanium, zirconium, hafnium, tin, vanadium, lanthanum, aluminum, cerium, molybdenum, uranium, thorium, magnesium, calcium, strontium, barium, manganese, nickel, cobalt, iron, copper, cadmium, and zinc. Of the divalent metal ions, magnesium, calcium, and zinc are particularly advantageous due at least in part to their low toxicity, low cost, and ease of reaction to form a range of layered metal phosphites. It is contemplated that a metal phosphite of the present invention may comprise more than one metal ion. It is also contemplated that more than one metal phosphite can be incorporated into a polymer.

For layered metal phosphites, it is advantageous to incorporate one or more phosphonates of the composition R—$PO_3^{-2}$ along with the phosphite group H—$PO_3^{-2}$ in order to control the spacing between the layers. Non-limiting examples of R-groups that can advantageously be used as the R-groups in the metal phosphites of the present invention include hydroxyl, alkyl, alkoxy, aryl, aryloxy, and moieties incorporating more than one such functionality. For example, suitable R-groups include hydroxyl (with the starting phosphonic acid being phosphoric acid); methyl, ethyl, propyl, butyl, hexyl, octyl, decyl, dodecyl, or higher alkyl phosphonic acids; phenyl, benzyl, biphenyl, and substituted aryl phosphonic acids; oxyethyl, oxypropyl, oxybutyl, oxyoctyl, poly(ethyleneoxy)phenyl and substituted poly(ethyleneoxy)phenyl phosphonic acids (also known generically as phosphoric acid monoesters). The R-groups can also contain additional functional groups, such as carboxyl, hydroxyl, amino, and halo groups. The R-groups advantageously possess chemical and thermal stability at the melt processing temperatures required for polymers. The inventor has determined that hydroxyl, alkyl, and phenyl are particularly advantageous R-groups because metal phosphites containing these R-groups exhibit high thermal and thermo-oxidative stability. In order to incorporate acidic or basic sites it is particularly advantageous to incorporate phosphate groups, which in their un-ionized from act as acid catalysts, and in their neutralized form act as basic catalysts. In order to prepare layered metal phosphites, it is preferable to precipitate the metal phosphites by addition of solutions of the starting phosphonic acids with solutions of the corresponding metal salts.

Non-layered metal phosphites may also be prepared analogously, or may be prepared by incorporation of phosphorous acid into a preformed insoluble metal oxide or hydrous oxide. Thus, for example, aluminum phosphite or can be precipitated by mixing a solution of aluminum acetate or aluminum chloride with a solution of sodium phosphite; or by imbibing precipitated aluminum hydroxide with a solution of phosphorous acid. Examples of non-layered metal phosphites include but are not limited to calcium phosphite, magnesium phosphite, zinc phosphite, and aluminum phosphite.

To maximize the scavenging efficacy of the metal phosphites of the present invention, it is considered advantageous to maximize the amount of the phosphite group H—$PO_3^{-2}$ present in the metal-phosphite. The mole ratio of phosphite to metal can range from 0.1 to 1 for divalent metals and 0.1 to 2 for tetravalent metals; however, in order to accommodate acidic or basic catalysts and phosphonates of the composition R—$PO_3^{2}$, the mole ratio of the phosphite group H—$PO_3^{-2}$ to metal will generally be between 0.4 and 1.6 for tetravalent metals and 0.2 to 0.8 for divalent metals.

While it is possible to pre-incorporate the acidic or basic sites into the metal phosphite, it is also possible to generate the acidic or basic sites in situ through oxidation of a portion of the P—H functionality. This latter approach may be advantageous in instances where it is preferred to delay the onset of scavenging activity. Oxidation of a portion of the P—H functionality can be carried out by heating the metal phosphite or resin containing the metal phosphite to temperatures of ~150 deg C. in air. Fortuitously, these conditions are similar to those employed to crystallize and dry PET resins. For resins where sufficient acidic or basic functionality is already present in the polymer, incorporation of additional acidic or basic sites into the metal phosphites is not required. Examples of polymers which may not require additional acidic or basic functionality include but are not limited to polyacrylic acid, poly(methyl methacrylate), ethylene-acrylic copolymers, and polyamides.

In general for a given additive, higher loadings will result in a higher rate of reaction of the aldehyde as well as a higher amount of aldehyde that can be scavenged. Higher loadings are therefore relatively preferred over lower loadings. The upper limit of the amount of additive to be incorporated is dictated by the rate of aldehyde removal desired, and by the impact of higher loadings on other factors, such as degree of particulate haze, processability, and cost. As will be seen in the examples, loadings of 100–1000 ppm are usually sufficient to achieve the technical effect desired for most applications.

The compositions of the polyesters contemplated in the present invention are not critical, and essentially any monomer or co-monomer can be utilized without adversely affecting the performance of the additives in reducing the aldehyde content. Because of their economic importance, polyesters based on terephthalic acid and ethylene glycol are considered especially useful in the methods and compositions of the invention.

The point of addition of the additives of the present invention is not critical, as long as they are added prior to forming the final article and sufficient acidic or basic sites are present in the polymer. However, it is important to maximize the degree of dispersion of the additives within the polyester matrix. For this reason, it is considered advantageous to add the metal phosphites at a point in the process that allows sufficient melt mixing to occur. For most applications, it is sufficient to add the metal phosphites as powders or as dispersions immediately prior to the injection molding process. However, it is possible to add the metal phosphites before or during the polymerization process. Addition of the metal phosphites of the present invention early in polymerization process is advantageous when removal of aldehydes present as impurities in the raw materials (such as 4-CBA) is desired. Addition of the metal phosphites at the end of melt polymerization is advantageous when the object is to decrease the time required to remove AA or other aldehydes in the solid-state polymerization process, or when the object is to eliminate the need for a solid-state polymerization process altogether. In instances where aldehydes are generated during the polymerization process, such as in the melt-polymerization of PET, it is advantageous to add the metal phosphites after the melt polymerization is essentially complete in order to minimize the amount of metal phosphite required to achieve the intended effect in the final solid articles.

The method of incorporation of the disclosed additives into polyesters is not critical. The additives can be dispersed in a solid or liquid carrier, and mixed with the polyester pellets immediately before injection molding. They may also be incorporated by spraying a slurry of the additive onto the polymer pellets prior to drying. They may be incorporated by injection of a dispersion of the additive into pre-melted polyester. They may also be incorporated by making a masterbatch of the additive with the polyester, and then mixing the masterbatch pellets with the polymer pellets at the desired level before drying and injection molding or extrusion. In addition to the use of slurries or dispersions, the additives of the present invention may be incorporated as dry powders.

Because the additives of the present invention are effective at reducing the acetaldehyde content of polyesters, where low AA levels are important they are useful for achieving very low preform and beverage AA levels in polyester containers.

EXAMPLES

The following examples illustrate exemplary embodiments of the invention, including the use of exemplary additives for decreasing the aldehyde content of polymers. The examples are provided to more fully describe the invention and are not intended to represent any limitation as to the scope thereof. In these examples, the effectiveness of the additives in reducing the aldehyde content was determined by measuring the AA content of PET in the presence of the additive, relative to the AA content of identically processed PET without the additive. The AA content was determined by taking a representative portion of the melt-processed polyester, grinding it to pass a 20 mesh (850 micron) screen, and desorbing the contained AA from 0.1 grams of the ground polyester by heating at the specified time and temperature in a sealed 20 mL vial. The desorbed AA in the headspace of the vial was then analyzed using a gas chromatograph equipped with a flame ionization detector.

Examples 1–4

In the following examples, 500 ppm of zinc phosphite phenylphosphonate $[Zn(O_3PH)_{0.5}(O_3PPh)_{0.5}]$ with an average particle size of >10 microns was blended with PET in a single-screw extruder for the indicated number of passes. Between each pass, the resin was chopped, crystallized, and dried. The resin was then injection molded into 24 gram preforms and the AA content measured. The results tabulated below show the increasing effectiveness of the zinc phosphite phenylphosphonate at scavenging AA as the amount of heat history increased. These results demonstrate the effectiveness a layered metal phosphite for scavenging aldehydes where the presence of an acidic catalyst is introduced through the partial oxidation of the phosphite functionality to phosphate. Color values were measured on bottles blown from the preforms from the two and three pass material. The b* color values demonstrate that PET containing the zinc phosphite phenylphosphonate did not increase in yellowness with increasing heat history.

| Example No. | Number of passes before injection molding | % AA Decrease | b* color[1] |
|---|---|---|---|
| 1 | 0 | 15.2 | — |
| 2 | 1 | 31.8 | 2.66 |
| 3 | 2 | 44.3 | 1.96 |

[1]b* of the PET control was 1.28

Examples 4–5

In the following examples, 500 ppm of zinc phosphite phenylphosphonate $[Zn(O_3PH)_{0.5}(O_3PPh)_{0.5}]$ with an average particle size of <1 microns was blended with PET in a single-screw extruder for the indicated number of passes. Between each pass, the resin was chopped, crystallized, and dried. The resin was then injection molded into 24 gram preforms and the AA content measured. The results tabulated below show the increasing effectiveness of the zinc phosphite phenylphosphonate at scavenging AA as the amount of heat history increased. These results demonstrate the effectiveness a layered metal phosphite for scavenging aldehydes where the presence of an acidic catalyst is introduced through the partial oxidation of the phosphite functionality to phosphate. These results also demonstrate the relatively greater effectiveness of a smaller particle size metal phosphite for scavenging AA vs. a larger particle size metal phosphite of the same chemical composition.

| Example No. | Number of passes before injection molding | % AA Decrease |
|---|---|---|
| 4 | 0 | 5.3 |
| 5 | 1 | 48.2 |

Example 6

500 ppm of calcium phosphite octylphosphonate phosphate [$Ca(O_3PH)_{0.475}(O_3C_8H_{17})_{0.475}(O_3POH)_{0.05}$] with an average particle size of ~5 microns was coated onto dry PET pellets, which were then injection molded into 24 gram preforms. The preforms exhibited a 17.6% lower AA content that the PET control.

Example 7

500 ppm of calcium phosphite octylphosphonate phosphate [$Ca(O_3PH)_{0.475}(O_3C_8H_{17})_{0.475}(O_3POH)_{0.05}$] with an average particle size of ~5 microns was coated onto dry PET pellets, which were then injection molded into 24 gram preforms. The preforms exhibited a 23.7% lower AA content that the PET control. Examples 6 and 7 demonstrate the effectiveness of a metal phosphite containing acidic sites in reducing the aldehyde content of a polymer in the absence of a heat history.

Example 8

50 grams of aluminum trihydrate was dispersed in water along with 40 grams of phosphorous acid. The water was then removed on a steam bath, and the resulting aluminum phosphite was ground with a mortar and pestle. The aluminum phosphite was then coated at a 500 ppm loading onto dry PET pellets and injection molded into 24 gram preforms. The preforms exhibited a 37.0% lower AA content that the PET control. Example 8 demonstrates the effectiveness of a non-layered metal phosphite in scavenging AA in PET.

Examples 9–15

The following metal phosphonates were coated at a 500 ppm loading onto dry PET pellets and injection molded into 24 gram preforms. The amount of AA reduction measured is tabulated below:

| Metal phosphonate | Preform AA | % AA Reduction |
|---|---|---|
| None | 7.03 | — |
| $Ca(O_3PH)_{0.5}(O_3PONa)_{0.5}$ | 5.90 | 16.1 |
| $Ca(O_3PH)_{0.4}(O_3PC_8H_{17})_{0.4}$—$(O_3PONa)_{0.2}$ | 5.24 | 25.5 |
| $Ca(O_3PH)_{0.45}(O_3PC_8H_{17})_{0.45}$—$(O_3PONa)_{0.1}$ | 5.09 | 27.6 |
| $Ca(O_3PH)_{0.5}(O_3PC_8H_{17})_{0.5}$ | 4.78 | 32.0 |
| $Ca(O_3PH)_{0.75}(O_3PONa)_{0.25}$ | 4.89 | 30.4 |
| $Ca(O_3PH)_{0.4}(O_3PC_8H_{17})_{0.4}$—$(O_3POH)_{0.2}$ | 4.68 | 33.4 |

The invention has been described with reference to a preferred embodiment. Modifications and alternatives will be apparent to the skilled artisan upon reading and understanding the preceding detailed description. It is intended that the invention be construed as including all such modifications and alternatives that fall within the scope of the appended claims or equivalents thereof.

The foregoing disclosure includes that best mode of the inventor for practicing the invention. It is apparent, however, that those skilled in the relevant art will recognize variations of the invention that are not described herein. While the invention is defined by the appended claims, the invention is not limited to the literal meaning of the claims, but also includes these variations.

I claim:

1. A method to decrease an aldehyde content of a polymer comprising incorporating into the polymer an effective amount of a metal phosphite additive in the presence of an effective amount of acidic or basic groups.

2. The method of claim 1, wherein the metal phosphite is a divalent metal phosphite.

3. The method of claim 1, wherein the metal phosphite is a trivalent metal phosphite.

4. The method of claim 1, wherein the metal phosphite is a tetravalent metal phosphite.

5. The method of claim 1, wherein the metal phosphite comprises the acidic or basic groups.

6. The method of claim 1, wherein the step of incorporating comprises adding the metal phosphite additive to a molten form of the polymer.

7. The method of claim 1, wherein the polymer is a poly(ethylene terephthalate) homopolymer or copolymer.

8. The method of claim 1, wherein the metal phosphite additive is present in the polyester at a concentration of between about 1 and about 2000 ppm.

9. The method of claim 1, wherein the metal phosphite additive is present in the polyester at a concentration of between about 10 and about 500 ppm.

10. The method of claim 1, wherein the metal phosphite additive has a mean particle size less than about 30 microns.

11. The method of claim 1, wherein the metal phosphite additive has a mean particle size less than about 5 microns.

12. The method of claim 1, further comprising molding the polymer into a solid article.

13. The method of claim 12, wherein the solid article is a container.

14. The method of claim 1, wherein the metal phosphite additive is a layered metal phosphite.

15. The method of claim 1 wherein the metal phosphite additive is a non-layered metal phosphite.

16. The method of claim 1 wherein the metal phosphite additive comprises one or more metal ions of the group of elements consisting of titanium, zirconium, hafnium, tin, vanadium, lanthanum, aluminum, cerium, molybdenum, uranium, thorium, magnesium, calcium, strontium, barium, manganese, nickel, cobalt, iron, copper, cadmium, and zinc.

17. The method of claim 1 wherein the metal phosphite additive comprises an organic phosphonate.

* * * * *